(12) United States Patent
Chi et al.

(10) Patent No.: US 12,425,075 B2
(45) Date of Patent: Sep. 23, 2025

(54) PRECODING METHOD, USER EQUIPMENT, AND RECONFIGURABLE INTELLIGENT SURFACE (RIS) ARRAY

(71) Applicant: BEIJING XIAOMI MOBILE SOFTWARE CO., LTD., Beijing (CN)

(72) Inventors: Liangang Chi, Beijing (CN); Li Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 37 days.

(21) Appl. No.: 18/704,574

(22) PCT Filed: Oct. 27, 2021

(86) PCT No.: PCT/CN2021/126840
§ 371 (c)(1),
(2) Date: Apr. 25, 2024

(87) PCT Pub. No.: WO2023/070407
PCT Pub. Date: May 4, 2023

(65) Prior Publication Data
US 2024/0413856 A1 Dec. 12, 2024

(51) Int. Cl.
*H04B 7/04* (2017.01)
*H01Q 3/22* (2006.01)
*H04B 7/06* (2006.01)

(52) U.S. Cl.
CPC .......... *H04B 7/04013* (2023.05); *H01Q 3/22* (2013.01); *H04B 7/0634* (2013.01)

(58) Field of Classification Search
CPC .............. H04B 7/04013; H04B 7/0634; H04B 7/0456; H04B 7/15; H01Q 3/22
See application file for complete search history.

(56) References Cited

U.S. PATENT DOCUMENTS

| 2018/0076870 | A1 | 3/2018 | Kim et al. | |
| 2021/0013619 | A1* | 1/2021 | Alkhateeb | H04B 7/04013 |
| 2022/0322321 | A1* | 10/2022 | Dai | H04W 72/51 |

OTHER PUBLICATIONS

European Patent Application No. 21961775.0 Search Report dated Dec. 3, 2024, 11 pages.

* cited by examiner

*Primary Examiner* — Sung S Ahn
(74) *Attorney, Agent, or Firm* — Cozen O'Connor

(57) ABSTRACT

A precoding method, performed by a reconfigurable intelligent surface (RIS) array, includes determining a phase shift list corresponding to the RIS array, in which the phase shift list includes at least one row of phase shift sequence, the phase shift sequence includes a phase shift of each RIS array element in the RIS array, each row of phase shift sequence is configured to cause the RIS array to reflect an incident signal along a pair of reflection angles, and each row of phase shift sequence corresponds to one index value; acquiring a first index value from a user equipment (UE); determining a first phase shift sequence corresponding to the first index value from the phase shift list; and precoding the RIS array by configuring the phase shift of each RIS array element in the RIS array according to the first phase shift sequence.

20 Claims, 10 Drawing Sheets determining a phase shift list corresponding to an RIS array, wherein the phase shift list comprises at least one row of phase shift sequence, and the phase shift sequence comprises a phase shift of each RIS array element in the RIS array, wherein each row of phase shift sequence is configured to cause the RIS array to reflect an incident signal along a pair of reflection angles, the pair of reflection angles comprises a horizontal-dimension reflection angle and a vertical-dimension reflection angle, and each row of phase shift sequence corresponds to one index value — 401 determining an optimal phase shift sequence — 402 sending a first index value corresponding to the optimal phase shift sequence to the RIS array — 403

FIG. 4

PRECODING METHOD, USER EQUIPMENT, AND RECONFIGURABLE INTELLIGENT SURFACE (RIS) ARRAY

CROSS-REFERENCE TO RELATED APPLICATION

This application is a national phase of International Application No. PCT/CN2021/126840, filed on Oct. 27, 2021, the entire content of which is incorporated herein by reference.

TECHNICAL FIELD

The disclosure relates to the field of wireless communication technologies, and particularly to a precoding method, a user equipment (UE), and a reconfigurable intelligent surface (RIS) array.

BACKGROUND

In communication systems, a reconfigurable intelligent surface (RIS) is a programmable device that can be used to steer electromagnetic signals. The introduction of RIS precoding technologies enables an incident signal sent from a base station to an RIS to be redirected to a user equipment (UE) in a desired direction, thereby constructing an intelligently programmable wireless environment. This strengthens the received signal strength at the UE and achieves control over channels.

In the related art, a joint precoding design at the RIS and the base station heavily relies on alternate optimization technologies, but such manners tend to be overly complex and less applicable in practice.

SUMMARY

According to an aspect of the disclosure, a precoding method is provided and is applicable to an RIS array. The method includes: determining a phase shift list corresponding to the RIS array, in which the phase shift list includes at least one row of phase shift sequence, the phase shift sequence includes a phase shift of each RIS array element in the RIS array, each row of phase shift sequence is configured to cause the RIS array to reflect an incident signal along a pair of reflection angles, the pair of reflection angles includes a horizontal-dimension reflection angle and a vertical-dimension reflection angle, and each row of phase shift sequence corresponds to one index value; acquiring a first index value from a user equipment (UE); determining a first phase shift sequence corresponding to the first index value from the phase shift list; and precoding the RIS array by configuring the phase shift of each RIS array element in the RIS array according to the first phase shift sequence.

According to another aspect of the disclosure, a precoding method is provided and is applicable to a UE. The method includes: determining a phase shift list corresponding to an RIS array, in which the phase shift list includes at least one row of phase shift sequence, the phase shift sequence includes a phase shift of each RIS array element in the RIS array, each row of phase shift sequence is configured to cause the RIS array to reflect an incident signal along a pair of reflection angles, the pair of reflection angles includes a horizontal-dimension reflection angle and a vertical-dimension reflection angle, and each row of phase shift sequence corresponds to one index value; determining an optimal phase shift sequence; and sending a first index value corresponding to the optimal phase shift sequence to the RIS array.

According to still another aspect of the disclosure, a communication device including a processor and a memory storing a computer program is provided, in which when the computer program is executed by the processor, the communication device is caused to perform the method according to the above one aspect.

According to still another aspect of the disclosure, a communication device including a processor and a memory storing a computer program is provided, in which when the computer program is executed by the processor, the communication device is caused to perform the method according to the above another aspect.

BRIEF DESCRIPTION OF THE DRAWINGS

The above and/or additional aspects and advantages of the disclosure will become obvious and easy to understand from the following descriptions according to the embodiments in conjunction with the accompanying drawings.

FIG. 4 is a flowchart illustrating a precoding method according to yet still other embodiments of the disclosure.

DETAILED DESCRIPTION

Reference will now be made in detail to some embodiments, examples of which are illustrated in the accompanying drawings. The following descriptions refer to the accompanying drawings in which the same numbers in different drawings represent the same or similar elements unless otherwise represented. The implementations set forth in the following descriptions according to some embodiments do not represent all implementations consistent with the disclosure. Instead, they are merely examples of apparatuses and methods consistent with aspects related to the disclosure as recited in the appended claims.

Terms used according to embodiments of the disclosure are merely for describing specific examples and are not intended to limit embodiments of the disclosure. The singular forms "a", "the", and the like used in the disclosure and the appended claims are also intended to include a multiple form, unless other meanings are clearly represented in the context. It should also be understood that the term "and/or" used in the disclosure refers to any or all of possible combinations including one or more associated listed items.

It should be understood that although terms "first", "second", "third", and the like are used according to embodiments of the disclosure to describe various information, the information is not limited to the terms. These terms are merely used to differentiate information of a same type. For example, without departing from the scope according to embodiments of the disclosure, first information is also referred to as second information, and similarly the second information is also referred to as the first information. Depending on the context, for example, the term "if", "in case of", and the like used herein may be explained as "when" or "while", or "in response to . . . , it is determined that".

A precoding method, a precoding apparatus, a coding device, a decoding device, and a storage medium according to embodiments of the disclosure are described with reference to the accompanying drawings.

Figure 1:
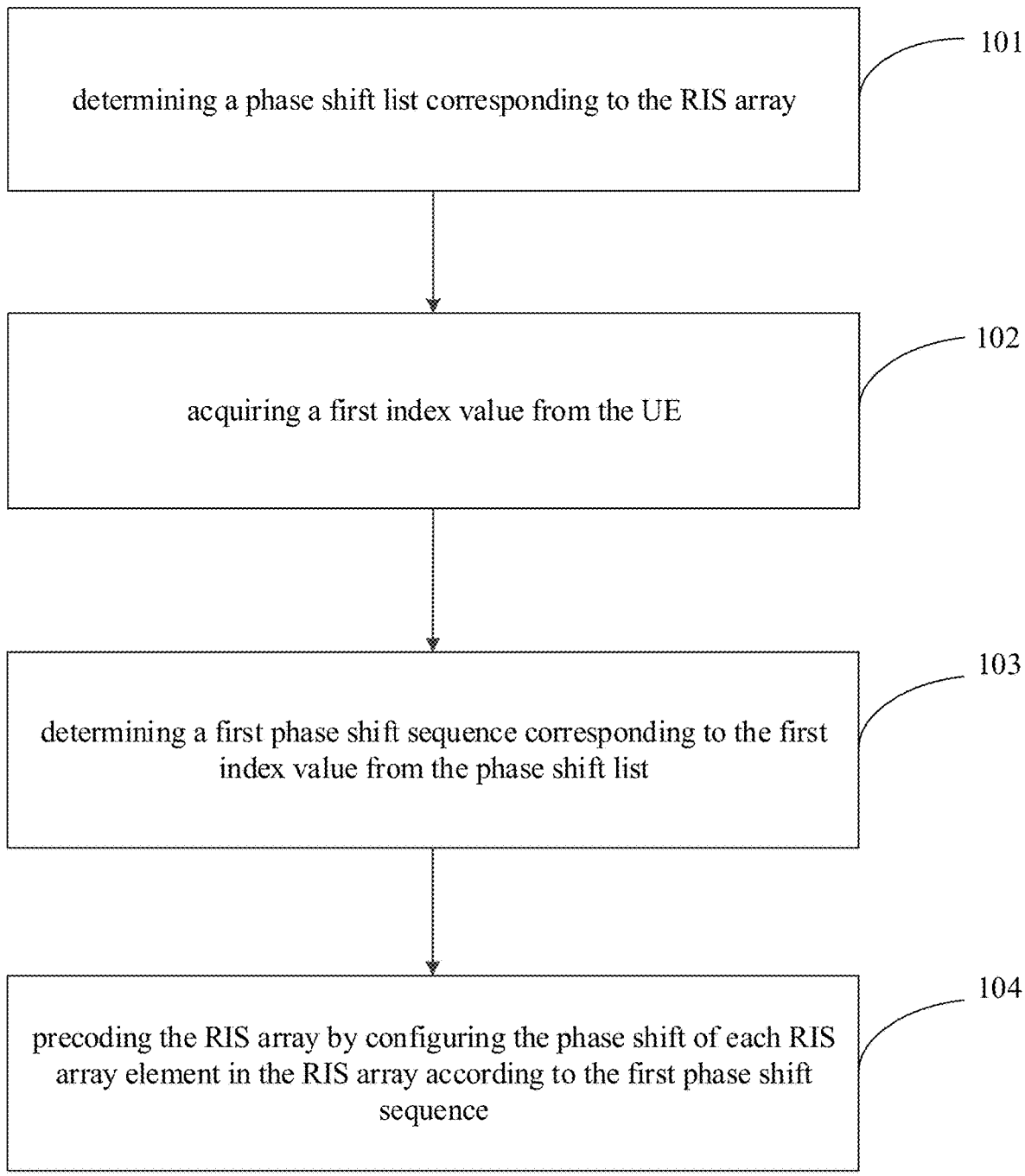
FIG. 1 is a flowchart illustrating a precoding method according to some embodiments of the disclosure.

FIG. 1 is a flowchart illustrating a precoding method according to some embodiments of the disclosure. The method is performed by a reconfigurable intelligent surface (RIS) array. As illustrated in FIG. 1, the precoding method may include following steps.

At step 101, a phase shift list corresponding to the RIS array is determined.

According to embodiments of the disclosure, the phase shift list may include at least one row of phase shift sequence, the phase shift sequence may include a phase shift of each RIS array element in the RIS array, and each row of phase shift sequence is configured to cause the RIS array to reflect an incident signal along a pair of reflection angles. The pair of reflection angles includes a horizontal-dimension reflection angle and a vertical-dimension reflection angle. The incident signal may be an incident signal sent from the base station to the RIS. Different rows of phase shift sequences are configured to cause the RIS array to reflect the incident signal along different reflection angles. Meanwhile, each row of phase shift sequence corresponds to one index value.

According to embodiments of the disclosure, the phase shift list may be established by the RIS array.

According to other embodiments of the disclosure, the phase shift list may be established by the base station and sent to the RIS array.

Further, according to embodiments of the disclosure, the manner of establishing the phase shift list may specifically include following steps.

At step a, at least one pair of reflection angles is acquired by quantizing a horizontal-dimension reflection angle and a vertical-dimension reflection angle corresponding to the RIS array.

Assuming that the RIS array is an M×N array, and M and N are positive integers. The manner of acquiring the at least one pair of reflection angles by quantizing the horizontal-dimension reflection angle and the vertical-dimension reflection angle corresponding to the RIS array may include:

Quantizing the horizontal-dimension reflection angle by an interval $$\frac{2\pi}{M \times p},$$

and quantizing the vertical-dimension reflection angle by an interval $$\frac{2\pi}{N \times q},$$

where p, q are oversampling factors. Then, the at least one pair of reflection angles may be acquired by a combination of the quantized horizontal-dimension reflection angle and the quantized vertical-dimension reflection angle in pairs.

For example, according to embodiments of the disclosure, assuming that the horizontal-dimension reflection angle corresponding to the RIS array is 0° ~180°, the vertical-dimension reflection angle corresponding to the RIS array is 0° ~180°, a horizontal-dimension quantizing interval is 10°, and a vertical-dimension quantizing interval is 20°. The quantized horizontal-dimension reflection angle includes 0°, 10°, 20° . . . 180°; and the quantized vertical-dimension reflection angle includes 0°, 20°, 40° . . . 180°. At least one pair of reflection angles ($\beta_1$, $\beta_2$) is acquired by a combination of the quantized horizontal-dimension reflection angle and the quantized vertical-dimension reflection angle corresponding to the RIS array in pairs, where $\beta_1$ is a quantized horizontal-dimension reflection angle, and $\beta_2$ is a quantized vertical-dimension reflection angle. For example, ($\beta_1$, $\beta_2$) may be (10°, 20°), (20°, 40°), (0°, 20°), etc.

At step b, a pair of phase shift weight vectors corresponding to each pair of reflection angles quantized is determined according to a horizontal-dimension incident angle and a vertical-dimension incident angle of an incident signal. The pair of phase shift weight vectors includes a horizontal-dimension phase shift weight vector and a vertical-dimension phase shift weight vector.

According to embodiments of the disclosure, there is a calculation equation between a phase shift weight vector and a reflection angle. A pair of phase shift weight vectors corresponding to each pair of reflection angles may be determined according to the calculation equation. Descriptions of the above calculation equation may refer to descriptions of the related art, which will not be repeated herein.

According to embodiments of the disclosure, a specific function of the phase shift weight vector is: when the RIS array weights the incident signal according to the phase shift weight vector, the weighted incident signal may be reflected along the reflection angle corresponding to the phase shift weight vector.

At step c, a continuous phase shift of each RIS array element corresponding to each pair of phase shift weight vectors is determined.

According to embodiments of the disclosure, the manner for determining the continuous phase shift of each RIS array element corresponding to the phase shift weight vector according to the phase shift weight vector may refer to descriptions of the related art, which will not be repeated herein.

According to embodiments of the disclosure, the specific function of the continuous phase shift of each RIS array element corresponding to the phase shift weight vector is: when the phase shift of each RIS array element in the RIS array is configured according to the continuous phase shift of each RIS array element, the RIS array may achieve the corresponding phase shift weight vector, and further the RIS array weights the incident signal according to the phase shift weight vector, so that the weighted incident signal may be reflected along the reflection angle corresponding to the phase shift weight vector.

At step d, a quantized phase shift of each RIS array element corresponding to each pair of phase shift weight vectors is acquired by quantizing the continuous phase shift of each RIS array element corresponding to each pair of phase shift weight vectors.

For example, according to embodiments of the disclosure, it is assumed that a plurality of pairs of phase shift weight vectors determined according to each pair of reflection angles include a phase shift weight vector 1, a phase shift weight vector 2, and a phase shift weight vector 3 at the above step b. At the step d, a quantized phase shift of each RIS array element corresponding to the phase shift weight vector 1 may be acquired by quantizing the continuous phase shift of each RIS array element corresponding to the phase shift weight vector 1, a quantized phase shift of each RIS array element corresponding to the phase shift weight vector 2 may be acquired by quantizing the continuous phase shift of each RIS array element corresponding to the phase shift weight vector 2, and a quantized phase shift of each RIS array element corresponding to the phase shift weight vector 3 may be acquired by quantizing the continuous phase shift of each RIS array element corresponding to the phase shift weight vector 3.

It needs to be noted that, according to embodiments of the disclosure, the continuous phase shift of the RIS array element is quantized, since the phase shift of the RIS array element may only support certain several discrete values. The continuous phase shift of each RIS array element needs to be quantized to quantize the continuous phase shift to a phase shift supported by the RIS array element.

Further, according to embodiments of the disclosure, acquiring the quantized phase shift by quantizing the continuous phase shift may include:

setting at least one discrete phase shift; and quantizing the continuous phase shift by replacing the continuous phase shift by a discrete phase shift in the at least one discrete phase shift which has a minimum absolute value of a difference value with the continuous phase shift.

According to embodiments of the disclosure, the set discrete phase shift specifically may be a phase shift supported by the RIS array element. For example, the at least one discrete phase shift, for example, may be 0°, 45°, 90°, 120°. Assuming that the continuous phase shift of the certain RIS array element is 30°, the manner for quantizing the continuous phase shift of the certain RIS array element may be: determining the discrete phase shift (that is, the discrete phase shift) 45° that has a minimum absolute value of a difference value with the continuous phase shift 30°, from the discrete phase shifts 0°, 45°, 90°, and 120°, and the discrete phase shift 45° is determined as the quantized phase shift corresponding to the certain RIS array element.

At step e, at least one phase shift sequence is acquired by taking the quantized phase shift of each RIS array element corresponding to each pair of phase shift weight vectors as a phase shift sequence.

For example, according to embodiments of the disclosure, the quantized phase shift of each RIS array element corresponding to the phase shift weight vector 1 may be taken as a phase shift sequence 1, the quantized phase shift of each RIS array element corresponding to the phase shift weight vector 2 may be taken as a phase shift sequence 2, and the quantized phase shift of each RIS array element corresponding to the phase shift weight vector 3 may be taken as a phase shift sequence 3.

At step f, the phase shift list is established by sorting the at least one phase shift sequence by row.

According to embodiments of the disclosure, the manner of sorting the at least one phase shift sequence by row may include at least one of following manners.

In a first manner, phase shift sequences are sorted by row for a first time in order of sizes of horizontal-dimension reflection angles corresponding to the phase shift sequences, and phase shift sequences corresponding to the same horizontal-dimension reflection angle in the phase shift sequences after sorting for the first time, are sorted in order of sizes of vertical-dimension reflection angles corresponding to the phase shift sequences corresponding to the same horizontal-dimension reflection angle by row for a second time.

According to embodiments of the disclosure, when the phase shift sequences are sorted for the first time in the above first manner, it is inevitable that there will be phase shift sequences corresponding to the same horizontal-dimension reflection angle, in which case, the phase shift sequences corresponding to the same horizontal-dimension reflection angle may not be sorted during sorting for the first time. Based on this, by sorting in row for the second time in the above first manner, the phase shift sequences corresponding to the same horizontal-dimension reflection angle in the phase shift sequences after sorting for the first time, may be sorted, which achieves sorting of all phase shift sequences.

According to embodiments of the disclosure, phase shift sequences may be sorted by row for the first time in order of size from small to large of the horizontal-dimension reflection angle, and may be sorted by row for the second time in order of size from small to large of the vertical-dimension reflection angle.

For example, assuming that three phase shift sequences are obtained at the above step e, which are a phase shift weight vector 1, a phase shift weight vector 2, and a phase shift weight vector 3, respectively, a reflection angle corresponding to the phase shift weight vector 1 is (20°, 40°), a reflection angle corresponding to the phase shift weight vector 2 is (20°, 20°), and a reflection angle corresponding to the phase shift weight vector 3 is (10°, 40°). The manner for sorting the phase shift weight vector 1, the phase shift weight vector 2, and the phase shift weight vector 3 in the first manner may include: sorting the phase shift weight vector 1, the phase shift weight vector 2, and the phase shift weight vector 3 by row for the first time in order of size from small to large of the horizontal-dimension reflection angle corresponding to the phase shift weight vector 1, the phase shift weight vector 2, and the phase shift weight vector 3, in which case, the sequences after sorting by row for the first time may be the phase shift weight vector 3, the phase shift weight vector 1, and the phase shift weight vector 2. Then, based on the phase shift weight vector 1 and the phase shift weight vector 2 corresponding to the same horizontal-dimension reflection angle, the phase shift weight vector 1 and the phase shift weight vector 2 may be sorted by row for the second time in order of size from small to large of the vertical-dimension reflection angle, in which case, the sequences after sorting by row for the second time is the phase shift weight vector 3, the phase shift weight vector 2, and the phase shift weight vector 1.

In a second manner, phase shift sequences are sorted by row for a first time in order of sizes of vertical-dimension reflection angles corresponding to the phase shift sequences, and phase shift sequences corresponding to the same vertical-dimension reflection angle in the phase shift sequences after sorting for the first time, are sorted in order of sizes of horizontal-dimension reflection angles corresponding to the phase shift sequences corresponding to the same vertical-dimension reflection angle by row for a second time.

Descriptions of the second manner may refer to descriptions of the first manner, which will not be repeated herein.

In addition, it needs to be noted that, according to embodiments of the disclosure, after the at least one phase shift sequence is sorted by row, an index value may be further allocated for each phase shift sequence sorted, to constitute a phase shift list.

According to embodiments of the disclosure, the manner of allocating the index value for each phase shift sequence after sorting by row may include at least one of following manners.

In a first manner, one row index value is allocated for each row of phase shift sequence.

For example, assuming that the order after sorting the at least one phase shift sequence by row is the phase shift weight vector 3, the phase shift weight vector 2, and the phase shift weight vector 1, one row index value 1 may be allocated for the phase shift weight vector 3, one row index value 2 may be allocated for the phase shift weight vector 2, and one row index value 3 may be allocated for the phase shift weight vector 1. Table 1 is a table illustrating a phase shift list established in a first manner according to embodiments of the disclosure.

TABLE 1

| Row index value | Phase shift sequence |
|---|---|
| 1 | Phase shift sequence 3 |
| 2 | Phase shift sequence 2 |
| 3 | Phase shift sequence 1 |

In a second manner, the phase shift sequences sorted by row are grouped, and a group number for each phase shift sequence group is set. One phase shift sequence group includes adjacent at least one row of phase shift sequence; and each row of phase shift sequence is numbered in each phase shift sequence group.

For example, assuming that the order after sorting the at least one phase shift sequence by row is the phase shift weight vector 3, the phase shift weight vector 2, and the phase shift weight vector 1, the phase shift weight vector 3 and the phase shift weight vector 2 may be classified into one group with a group number "one", and the phase shift sequence 1 may be classified into another group with a group number "two". Then, intra-group numbers (1) and (2) are respectively configured for the phase shift weight vector 3 and the phase shift weight vector 2 in the group number "one", and an intra-group number (1) is configured for the phase shift weight vector 1 in the group number "two". Table 2 is a table illustrating a phase shift list established in a second method according to embodiments of the disclosure.

TABLE 2

| Group number | Intra-group number | Phase shift sequence |
|---|---|---|
| One | ① | Phase shift sequence 3 |
|  | ② | Phase shift sequence 2 |
| Two | ① | Phase shift sequence 1 |

At step 102, a first index value from the UE is acquired.

According to embodiments of the disclosure, the UE may refer to a device that provides voice and/or data connectivity for a user. The UE may communicate with one or more core networks via a radio access network (RAN). The UE may be an internet of things (IoT) terminal such as a sensor device, a mobile phone (or referred to as a cellular phone), and a computer having an IoT terminal such as a fixed, portable, compact, handheld, computer built-in or vehicle-mounted apparatus. For example, a station (STA), a subscriber unit, a subscriber station, a mobile station, a mobile, a remote station, an access point, a remote terminal, an access terminal, a user terminal, or a user agent. Alternatively, the UE may be a device of an unmanned aerial vehicle (UAV). Alternatively, the UE may be a vehicle-mounted device, for example, a vehicle computer with a wireless communication function, or a wireless terminal externally connected to a vehicle computer. Alternatively, the UE may be a roadside device, for example, a street lamp, a signal lamp, or other roadside device with a wireless communication function.

According to embodiments of the disclosure, the UE may determine an optimal reflection angle of the RIS array for an incident signal according to a channel estimation result, and determine an optimal phase shift sequence corresponding to the optimal reflection angle, and determine the first index value corresponding to the optimal phase shift sequence from the phase shift list and send the first index value to the RIS.

According to embodiments of the disclosure, the phase shift list at the UE end may be sent from the RIS to the UE. In other embodiments of the disclosure, the phase shift list at the UE end may be sent from the base station to the UE.

According to embodiments of the disclosure, the first index value from the UE may be a row index value corresponding to the optimal phase shift sequence.

In other embodiments of the disclosure, the first index value from the UE may be a group number and an intra-group number corresponding to the optimal phase shift sequence.

At step 103, a first phase shift sequence corresponding to the first index value is determined from the phase shift list.

The first phase shift sequence is an optimal phase shift sequence corresponding to the optimal reflection angle of the current incident signal in the RIS array.

According to embodiments of the disclosure, when the first index value is the first row index value, the RIS may determine the corresponding first phase shift sequence based on the first row index value.

According to embodiments of the disclosure, assuming that the first index value from the UE is a first row index value 1, it may be determined based on Table 1 that the first phase shift sequence corresponding to the first row index value 1 is the phase shift sequence 3.

According to other embodiments of the disclosure, when the first index value is the group number and the intra-group number, the RIS may determine the corresponding first phase shift sequence based on the group number and the intra-group number.

For example, according to embodiments of the disclosure, assuming that the first index value from the UE is a group number one, and an intra-group number (1), it may be determined based on Table 2 that the first phase shift sequence corresponding to the group number one and the intra-group number (1) is the phase shift sequence 3.

At step 104, the RIS array is precoded by configuring the phase shift of each RIS array element in the RIS array according to the first phase shift sequence.

Specifically, according to embodiments of the disclosure, configuring the phase shift of each RIS array element in the RIS array on the basis of the first phase shift sequence may include: performing phase shifting on each RIS array element according to the phase shift of each RIS array element in the first phase shift sequence.

After the phase shifting is performed on each RIS array element in the RIS array, each RIS array element after the phase shifting may be used to weight the incident signal according to the phase offset weight vector corresponding to the first phase shift sequence, so that the incident signal may be reflected to the UE end along the optimal reflection angle corresponding to the first phase shift sequence, which enhances the strength of signals at the UE end, and ensures the transmission performance of the signals in the communication system.

In summary, in the precoding method according to embodiments of the disclosure, the phase shift list corresponding to the RIS array may be determined first, the phase shift list includes at least one row of phase shift sequence, the phase shift sequence includes the phase shift of each RIS array element in the RIS array, each row of phase shift sequence is configured to cause the RIS array to reflect the incident signal along the pair of reflection angles, and each row of phase shift sequence corresponds to one index value. Then, the RIS array may acquire the first index value from the UE, determine the first phase shift sequence corresponding to the first index value, and precode the RIS array by configuring the phase shift of each RIS array element in the RIS array according to the first phase shift sequence. Consequently, according to embodiments of the disclosure, the phase shift list may be determined in advance, and the RIS array may be precoded according to the phase shift list, which may have the low complexity and high applicability.

Figure 2:
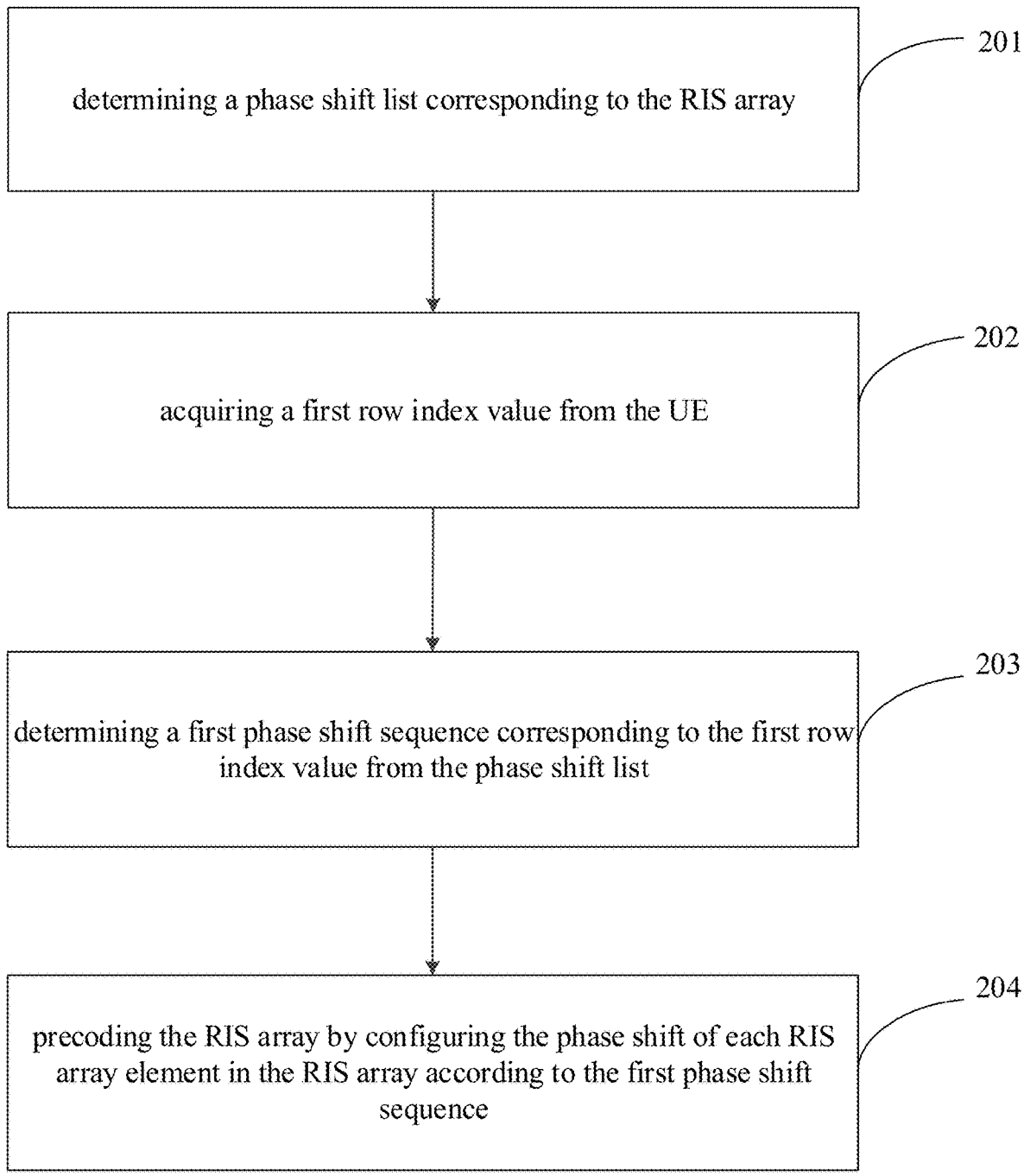
FIG. 2 is a flowchart illustrating a precoding method according to other embodiments of the disclosure.

FIG. 2 is a flowchart illustrating a precoding method according to some embodiments of the disclosure. The method is performed by a coding end. As illustrated in FIG. 2, the precoding method may include following steps.

At step 201, a phase shift list corresponding to an RIS array is determined. The phase shift list includes at least one row of phase shift sequence. The phase shift sequence includes a phase shift of each RIS array element in the RIS array. Each row of phase shift sequence is configured to cause the RIS array to reflect an incident signal along a pair of reflection angles. The pair of reflection angles includes a horizontal-dimension reflection angle and a vertical-dimension reflection angle. Each row of phase shift sequence corresponds to one index value.

At step 202, a first row index value from the UE is acquired.

At step 203, a first phase shift sequence corresponding to the first row index value is determined from the phase shift list.

At step 204, the RIS array is precoded by configuring the phase shift of each RIS array element in the RIS array according to the first phase shift sequence.

Descriptions of steps 201 to 204 may refer to descriptions of the above embodiments, which will not be repeated herein.

In summary, in the precoding method according to embodiments of the disclosure, the phase shift list corresponding to the RIS array may be determined first, the phase shift list includes at least one row of phase shift sequence, the phase shift sequence includes the phase shift of each RIS array element in the RIS array, each row of phase shift sequence is configured to cause the RIS array to reflect the incident signal along the pair of reflection angles, and each row of phase shift sequence corresponds to one index value. Then, the RIS array may acquire the first index value from the UE, determine the first phase shift sequence corresponding to the first index value, and precode the RIS array by configuring the phase shift of each RIS array element in the RIS array according to the first phase shift sequence. Consequently, according to embodiments of the disclosure, the phase shift list may be determined in advance, and the RIS array may be precoded according to the phase shift list, which may have the low complexity and high applicability.

Figure 3:
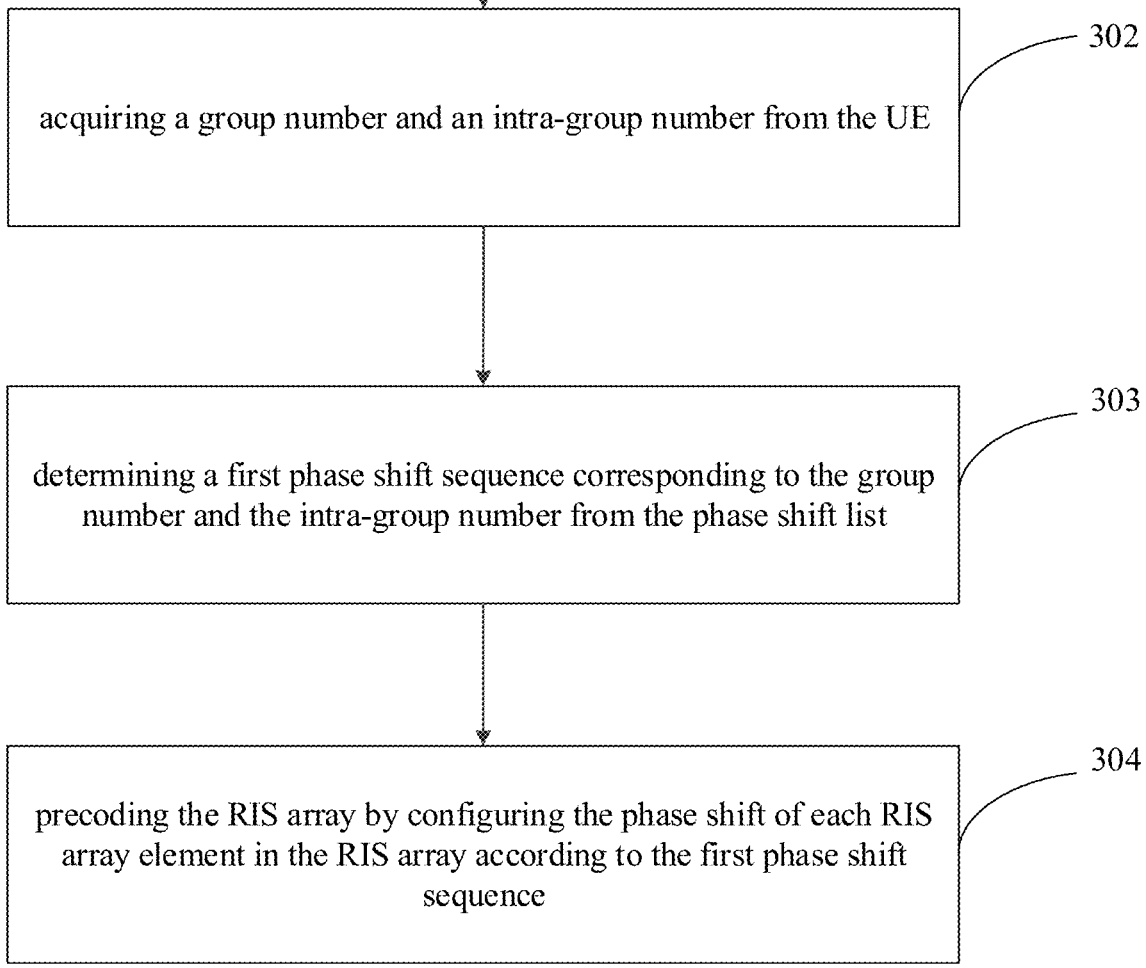
FIG. 3 is a flowchart illustrating a precoding method according to still other embodiments of the disclosure.

FIG. 3 is a flowchart illustrating a precoding method according to some embodiments of the disclosure. The method is performed by a coding end. As illustrated in FIG. 3, the precoding method may include following steps.

At step 301, a phase shift list corresponding to an RIS array is determined. The phase shift list includes at least one row of phase shift sequence. The phase shift sequence includes a phase shift of each RIS array element in the RIS array. Each row of phase shift sequence is configured to cause the RIS array to reflect an incident signal along a pair of reflection angles. The pair of reflection angles includes a horizontal-dimension reflection angle and a vertical-dimension reflection angle. The phase shift list includes at least one phase shift sequence group. One phase shift sequence group includes adjacent at least one row of phase shift sequence. Each row of phase shift sequence corresponds to a group number and an intra-group number.

At step 302, a group number and an intra-group number from the UE are acquired.

At step 303, a first phase shift sequence corresponding to the group number and the intra-group number is determined from the phase shift list.

At step 304, the RIS array is precoded by configuring the phase shift of each RIS array element in the RIS array according to the first phase shift sequence.

Descriptions of steps 301 to 304 may refer to descriptions of the above embodiments, which will not be repeated herein.

In summary, in the precoding method according to embodiments of the disclosure, the phase shift list corresponding to the RIS array may be determined first, the phase shift list includes at least one row of phase shift sequence, the phase shift sequence includes the phase shift of each RIS array element in the RIS array, each row of phase shift sequence is configured to cause the RIS array to reflect the incident signal along the pair of reflection angles, and each row of phase shift sequence corresponds to one index value. Then, the RIS array may acquire the first index value from the UE, determine the first phase shift sequence corresponding to the first index value, and precode the RIS array by configuring the phase shift of each RIS array element in the RIS array according to the first phase shift sequence. Consequently, according to embodiments of the disclosure, the phase shift list may be determined in advance, and the RIS array may be precoded according to the phase shift list, which may have the low complexity and high applicability.

FIG. 4 is a flowchart illustrating a precoding method according to some embodiments of the disclosure. The method is performed by a UE. As illustrated in FIG. 4, the precoding method may include following steps.

At step 401, a phase shift list corresponding to an RIS array is determined. The phase shift list includes at least one row of phase shift sequence. The phase shift sequence includes a phase shift of each RIS array element in the RIS array. Each row of phase shift sequence is configured to cause the RIS array to reflect an incident signal along a pair of reflection angles. The pair of reflection angles includes a horizontal-dimension reflection angle and a vertical-dimension reflection angle. Each row of phase shift sequence corresponds to one index value.

According to embodiments of the disclosure, the phase shift list may be established by the RIS array and sent to the UE. In other embodiments of the disclosure, the phase shift list may be established by the base station and sent to the UE.

At step 402, an optimal phase shift sequence is determined.

At step 403, a first index value corresponding to the optimal phase shift sequence is sent to the RIS array.

Descriptions of steps 401 to 403 may refer to descriptions of the above embodiments, which will not be repeated herein.

In summary, in the precoding method according to embodiments of the disclosure, the phase shift list corresponding to the RIS array may be determined first, the phase shift list includes at least one row of phase shift sequence, the phase shift sequence includes the phase shift of each RIS array element in the RIS array, each row of phase shift sequence is configured to cause the RIS array to reflect the incident signal along the pair of reflection angles, and each row of phase shift sequence corresponds to one index value. Then, the RIS array may acquire the first index value from the UE, determine the first phase shift sequence corresponding to the first index value, and precode the RIS array by configuring the phase shift of each RIS array element in the RIS array according to the first phase shift sequence. Consequently, according to embodiments of the disclosure, the phase shift list may be determined in advance, and the RIS array may be precoded according to the phase shift list, which may have the low complexity and high applicability.

Figure 5:
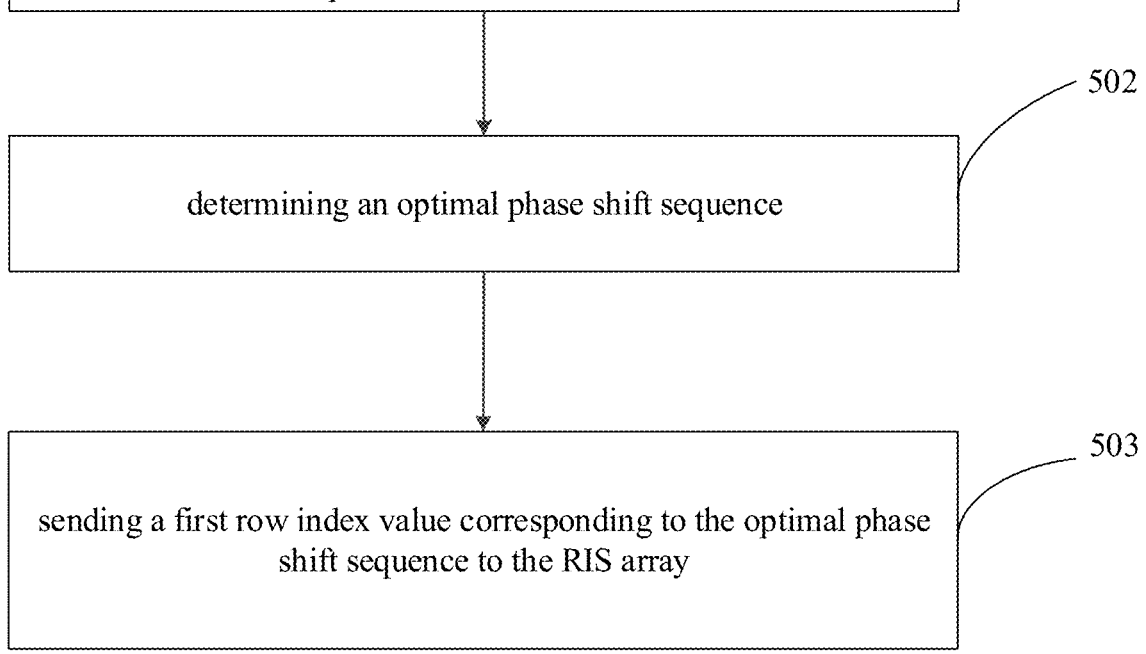
FIG. 5 is a flowchart illustrating a precoding method according to yet still other embodiments of the disclosure.

FIG. 5 is a flowchart illustrating a precoding method according to some embodiments of the disclosure. The method is performed by a UE. As illustrated in FIG. 5, the precoding method may include following steps.

At step 501, a phase shift list corresponding to an RIS array is determined. The phase shift list includes at least one row of phase shift sequence. The phase shift sequence includes a phase shift of each RIS array element in the RIS array. Each row of phase shift sequence is configured to cause the RIS array to reflect an incident signal along a pair of reflection angles. The pair of reflection angles includes a horizontal-dimension reflection angle and a vertical-dimension reflection angle. Each row of phase shift sequence corresponds to one row index value.

According to embodiments of the disclosure, the phase shift list may be established by the RIS array and sent to the UE. In other embodiments of the disclosure, the phase shift list may be established by the base station and sent to the UE.

At step 502, an optimal phase shift sequence is determined.

At step 503, a first row index value corresponding to the optimal phase shift sequence is sent to the RIS array.

Descriptions of steps 501 to 503 may refer to descriptions of the above embodiments, which will not be repeated herein.

In summary, in the precoding method according to embodiments of the disclosure, the phase shift list corresponding to the RIS array may be determined first, the phase shift list includes at least one row of phase shift sequence, the phase shift sequence includes the phase shift of each RIS array element in the RIS array, each row of phase shift sequence is configured to cause the RIS array to reflect the incident signal along the pair of reflection angles, and each row of phase shift sequence corresponds to one index value. Then, the RIS array may acquire the first index value from the UE, determine the first phase shift sequence corresponding to the first index value, and precode the RIS array by configuring the phase shift of each RIS array element in the RIS array according to the first phase shift sequence. Consequently, according to embodiments of the disclosure, the phase shift list may be determined in advance, and the RIS array may be precoded according to the phase shift list, which may have the low complexity and high applicability.

Figure 6:
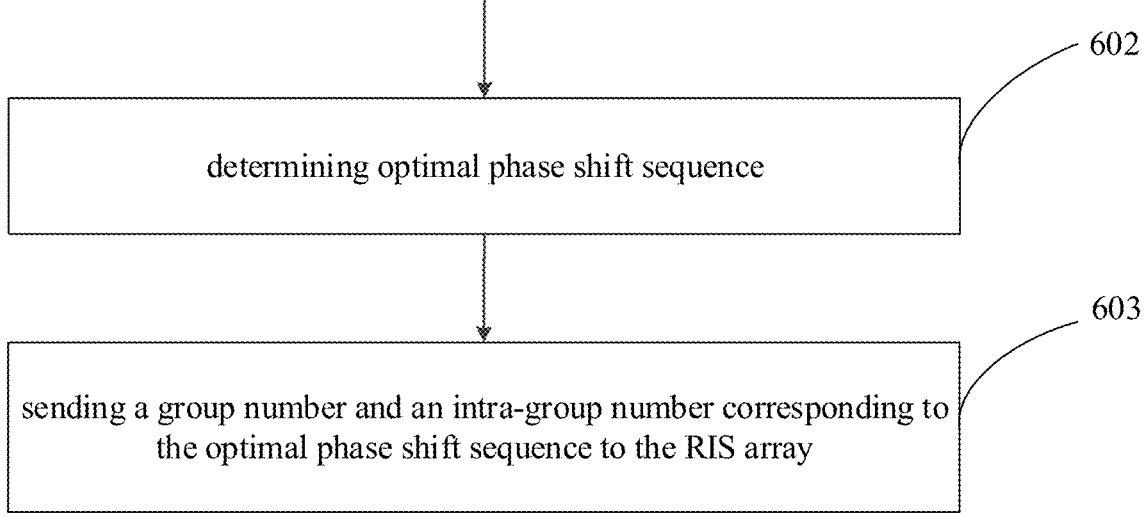
FIG. 6 is a flowchart illustrating a precoding method according to yet still other embodiments of the disclosure.

FIG. 6 is a flowchart illustrating a precoding method according to some embodiments of the disclosure. The method is performed by a UE. As illustrated in FIG. 6, the precoding method may include following steps.

At step 601, a phase shift list corresponding to an RIS array is determined. The phase shift list includes at least one row of phase shift sequence. The phase shift sequence includes a phase shift of each RIS array element in the RIS array. Each row of phase shift sequence is configured to cause the RIS array to reflect an incident signal along a pair of reflection angles. The pair of reflection angles includes a horizontal-dimension reflection angle and a vertical-dimension reflection angle. The phase shift list includes at least one phase shift sequence group. One phase shift sequence group includes adjacent at least one row of phase shift sequence. Each row of phase shift sequence corresponds to a group number and an intra-group number.

According to embodiments of the disclosure, the phase shift list may be established by the RIS array and sent to the UE. In other embodiments of the disclosure, the phase shift list may be established by the base station and sent to the UE.

It needs to be noted that, according to embodiments of the disclosure, the phase shift sequence list acquired by the UE from the RIS array or from the base station may have the group number and the intra-group number corresponding to each row of phase shift sequence. In other embodiments of the disclosure, the phase shift sequence list acquired by the UE from the RIS array or from the base station may not have the group number and the intra-group number corresponding to each row of phase shift sequence, in which case the UE may group each row of phase shift sequence in the phase shift list and set a group number for each phase shift sequence group, and one phase shift sequence group includes adjacent at least one row of phase shift sequence. Then, each row of phase shift sequence is numbered in each phase shift sequence. The manner for grouping each row of phase shift sequence, and setting the group number and the intra-group number may refer to descriptions of the above embodiments, which will not be repeated herein.

At step 602, an optimal phase shift sequence is determined.

At step 63, a group number and an intra-group number corresponding to the optimal phase shift sequence are sent to the RIS array.

Descriptions of steps 601 to 603 may refer to descriptions of the above embodiments, which will not be repeated herein.

In summary, in the precoding method according to embodiments of the disclosure, the phase shift list corresponding to the RIS array may be determined first, the phase shift list includes at least one row of phase shift sequence, the phase shift sequence includes the phase shift of each RIS array element in the RIS array, each row of phase shift sequence is configured to cause the RIS array to reflect the incident signal along the pair of reflection angles, and each row of phase shift sequence corresponds to one index value. Then, the RIS array may acquire the first index value from the UE, determine the first phase shift sequence corresponding to the first index value, and precode the RIS array by configuring the phase shift of each RIS array element in the RIS array according to the first phase shift sequence. Consequently, according to embodiments of the disclosure, the phase shift list may be determined in advance, and the RIS array may be precoded according to the phase shift list, which may have the low complexity and high applicability.

Figure 7:
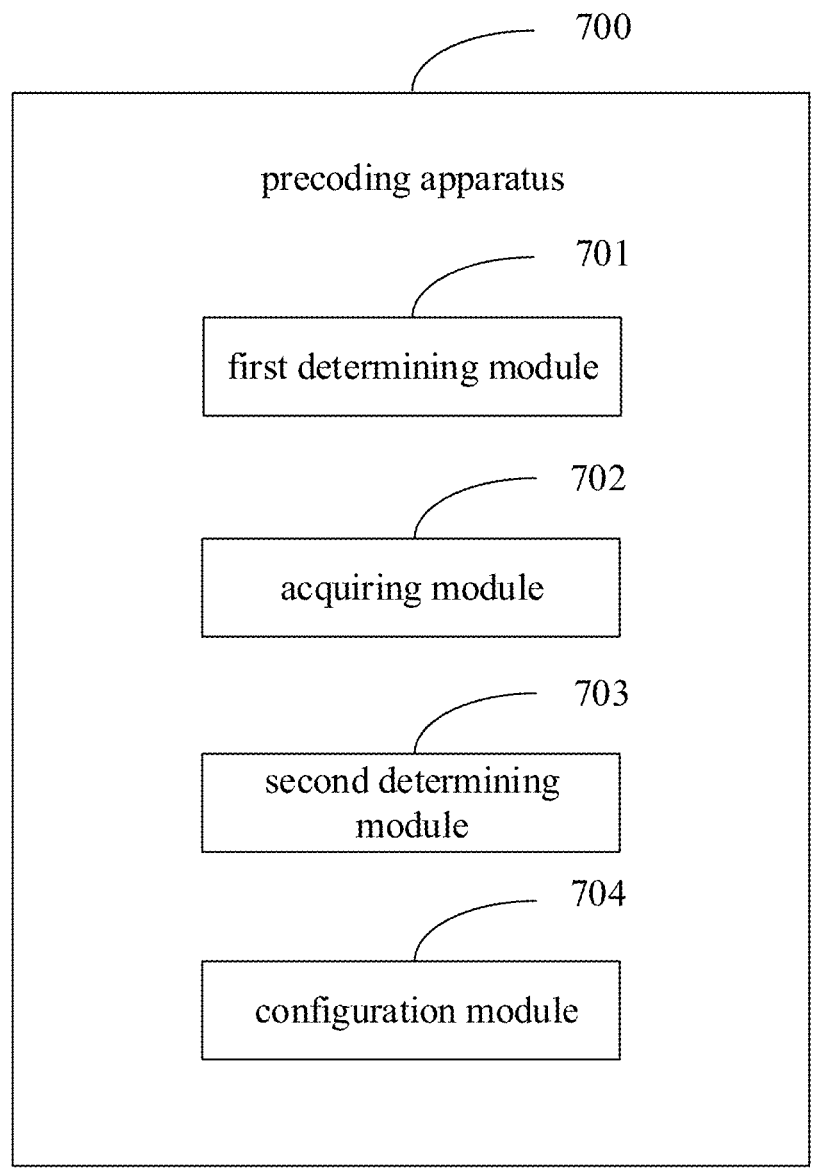
FIG. 7 is a block diagram illustrating a precoding apparatus according to some embodiments of the disclosure.

FIG. 7 is a block diagram illustrating a signal coding and decoding apparatus 700 according to some embodiments of the disclosure. As illustrated in FIG. 7, the signal coding and decoding apparatus 700 may include a first determining module 701, an acquiring module 702, a second determining module 703, and a configuration module 704.

The first determining module 701 is configured to determine a phase shift list corresponding to an RIS array. The phase shift list includes at least one row of phase shift sequence. The phase shift sequence includes a phase shift of each RIS array element in the RIS array. Each row of phase shift sequence is configured to cause the RIS array to reflect an incident signal along a pair of reflection angles. The pair of reflection angles includes a horizontal-dimension reflection angle and a vertical-dimension reflection angle. Each row of phase shift sequence corresponds to one index value.

The acquiring module 702 is configured to acquire a first index value from a UE.

The second determining module 703 is configured to determine a first phase shift sequence corresponding to the first index value from the phase shift list.

The configuration module 704 is configured to precode the RIS array by configuring the phase shift of each RIS array element in the RIS array according to the first phase shift sequence.

In summary, in the precoding apparatus according to embodiments of the disclosure, the phase shift list corresponding to the RIS array may be determined first, the phase shift list includes at least one row of phase shift sequence, the phase shift sequence includes the phase shift of each RIS array element in the RIS array, each row of phase shift sequence is configured to cause the RIS array to reflect the incident signal along the pair of reflection angles, and each row of phase shift sequence corresponds to one index value. Then, the RIS array may acquire the first index value from the UE, determine the first phase shift sequence corresponding to the first index value, and precode the RIS array by configuring the phase shift of each RIS array element in the RIS array according to the first phase shift sequence. Consequently, according to embodiments of the disclosure, the phase shift list may be determined in advance, and the RIS array may be precoded according to the phase shift list, which may have the low complexity and high applicability.

Optionally, according to embodiments of the disclosure, the first determining module is further configured to:
establish the phase shift list by the RIS array; and/or
receive the phase shift list from a base station.

Optionally, according to embodiments of the disclosure, the first determining module is further configured to:
acquire at least one pair of reflection angles by quantizing a horizontal-dimension reflection angle and a vertical-dimension reflection angle corresponding to the RIS array;
determine a pair of phase shift weight vectors corresponding to each pair of reflection angles quantized according to a horizontal-dimension incident angle and a vertical-dimension incident angle of an incident signal, in which the pair of phase shift weight vectors includes a horizontal-dimension phase shift weight vector and a vertical-dimension phase shift weight vector;
determine a continuous phase shift of each RIS array element corresponding to each pair of phase shift weight vectors;
acquire a quantized phase shift of each RIS array element corresponding to each pair of phase shift weight vectors by quantizing the continuous phase shift of each RIS array element corresponding to each pair of phase shift weight vectors;
acquire at least one phase shift sequence by taking the quantized phase shift of each RIS array element corresponding to each pair of phase shift weight vectors as a phase shift sequence; and
establish the phase shift list by sorting the at least one phase shift sequence by row.

Optionally, according to embodiments of the disclosure, the RIS array is an M×N array, and M and N are positive integers.

The first determining module is further configured to:
quantize the horizontal-dimension reflection angle by an interval $$\frac{2\pi}{M \times p},$$

and
quantize the vertical-dimension reflection angle by an interval $$\frac{2\pi}{N \times q},$$

where p, q are oversampling factors.

Optionally, according to embodiments of the disclosure, the first determining module is further configured to:
set at least one discrete phase shift; and
replace the continuous phase shift by a discrete phase shift in the at least one discrete phase shift which has a minimum absolute value of a difference value with the continuous phase shift.

Optionally, according to embodiments of the disclosure, the first determining module is further configured to:
sort phase shift sequences by row for a first time in order of sizes of horizontal-dimension reflection angles corresponding to the phase shift sequences, and sort, phase shift sequences corresponding to the same horizontal-dimension reflection angle in the phase shift sequences after sorting for the first time, in order of sizes of vertical-dimension reflection angles corresponding to the phase shift sequences corresponding to the same horizontal-dimension reflection angle by row for a second time; or
sort phase shift sequences by row for a first time in order of sizes of vertical-dimension reflection angles corresponding to the phase shift sequences, and sort, phase shift sequences corresponding to the same vertical-dimension reflection angle in the phase shift sequences after sorting for the first time, in order of sizes of horizontal-dimension reflection angles corresponding to the phase shift sequences corresponding to the same vertical-dimension reflection angle by row for a second time.

Optionally, according to embodiments of the disclosure, each row of phase shift sequence in the phase shift list corresponds to one row index value.

The acquiring module is further configured to:
acquire a first row index value from the UE.

Optionally, according to embodiments of the disclosure, the above apparatus is further configured to:

group phase shift sequences in the phase shift list and set a group number for each phase shift sequence group, in which one phase shift sequence group includes adjacent at least one row of phase shift sequence; and number each row of phase shift sequence in each phase shift sequence group.

Optionally, according to embodiments of the disclosure, the acquiring module is further configured to:

acquire a group number and an intra-group number from the UE.

Figure 8:
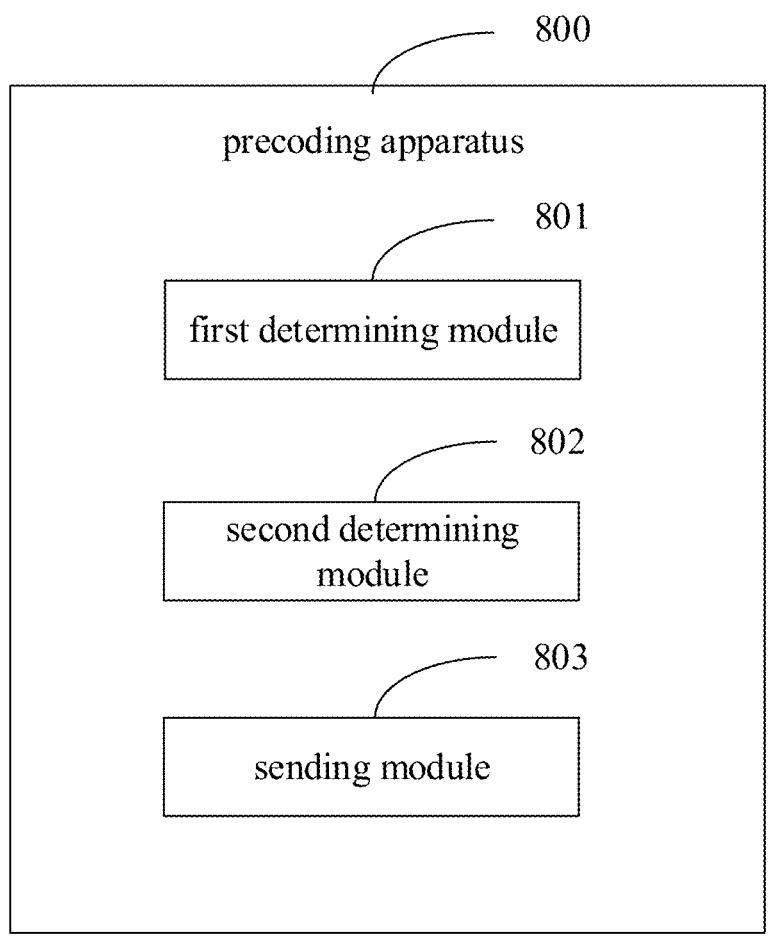
FIG. 8 is a block diagram illustrating a precoding apparatus according to other embodiments of the disclosure.

FIG. 8 is a block diagram illustrating a signal coding and decoding apparatus 800 according to some embodiments of the disclosure. As illustrated in FIG. 7, a signal coding and decoding apparatus 800 may include a first determining module 801, a second determining module 802, and a sending module 803.

The first determining module 801 is configured to determine a phase shift list corresponding to an RIS array. The phase shift list includes at least one row of phase shift sequence. The phase shift sequence includes a phase shift of each RIS array element in the RIS array. Each row of phase shift sequence is configured to cause the RIS array to reflect an incident signal along a pair of reflection angles. The pair of reflection angles includes a horizontal-dimension reflection angle and a vertical-dimension reflection angle. Each row of phase shift sequence corresponds to one index value.

The second determining module 802 is configured to determine an optimal phase shift sequence.

The sending module 803 is configured to send a first index value corresponding to the optimal phase shift sequence to the RIS array.

In summary, in the precoding apparatus according to embodiments of the disclosure, the phase shift list corresponding to the RIS array may be determined first, the phase shift list includes at least one row of phase shift sequence, the phase shift sequence includes the phase shift of each RIS array element in the RIS array, each row of phase shift sequence is configured to cause the RIS array to reflect the incident signal along the pair of reflection angles, and each row of phase shift sequence corresponds to one index value. Then, the RIS array may acquire the first index value from the UE, determine the first phase shift sequence corresponding to the first index value, and precode the RIS array by configuring the phase shift of each RIS array element in the RIS array according to the first phase shift sequence. Consequently, according to embodiments of the disclosure, the phase shift list may be determined in advance, and the RIS array may be precoded according to the phase shift list, which may have the low complexity and high applicability.

Optionally, according to embodiments of the disclosure, the first determining module is further configured to:

acquire the phase shift list from the RIS array; or acquire the phase shift list from a base station.

Optionally, according to embodiments of the disclosure, each row of phase shift sequence in the phase shift list corresponds to one row index value.

The sending module is further configured to:

send a first row index value corresponding to the optimal phase shift sequence to the RIS array.

Optionally, according to embodiments of the disclosure, the above apparatus is further configured to:

group phase shift sequences in the phase shift list and set a group number for each phase shift sequence group, in which one phase shift sequence group includes adjacent at least one row of phase shift sequence; and number each row of phase shift sequence in each phase shift sequence group.

Optionally, according to embodiments of the disclosure, the sending module is further configured to:

send a group number and an intra-group number corresponding to the optimal phase shift sequence to the RIS array.

Figure 9:
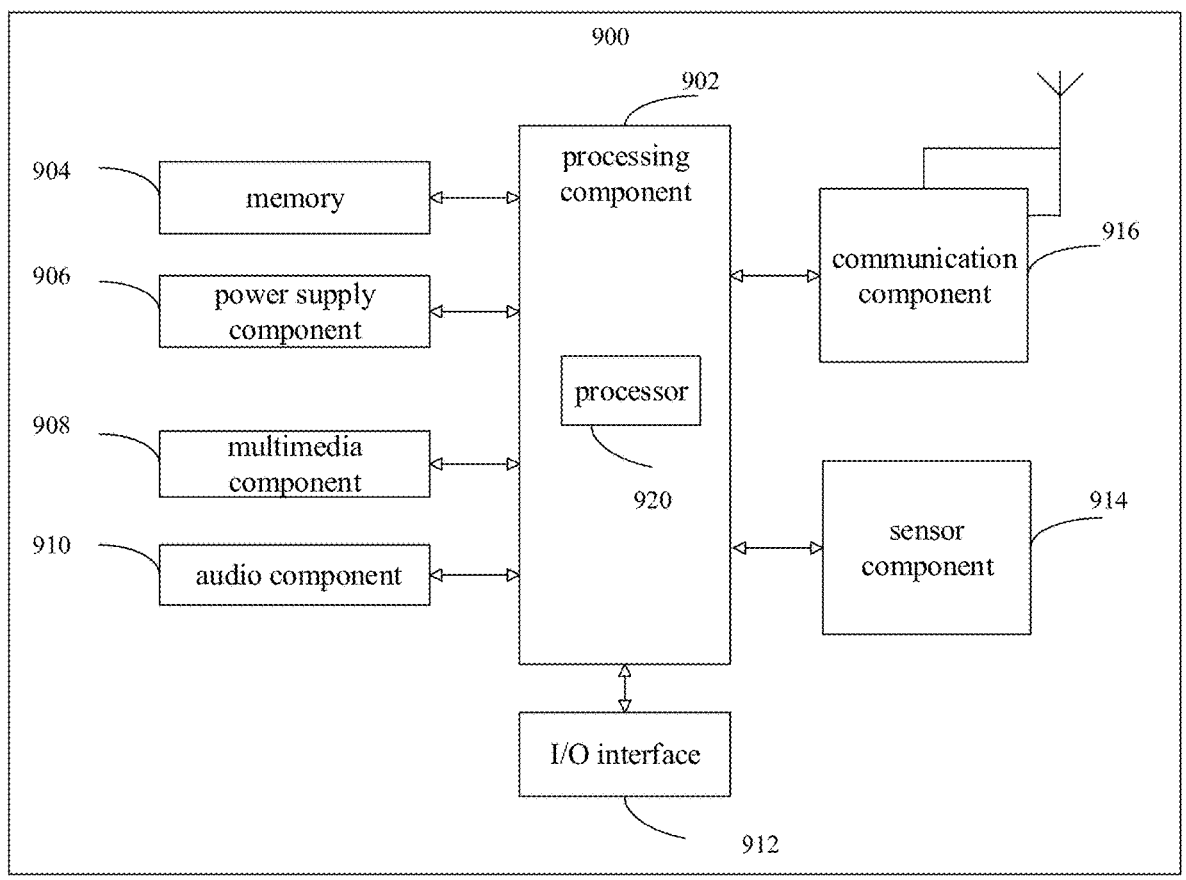
FIG. 9 is a block diagram illustrating a user equipment (UE) according to some embodiments of the disclosure.

FIG. 9 is a block diagram illustrating a UE 900 according to some embodiments of the disclosure. For example, the UE 900 may be a mobile phone, a computer, a digital broadcasting terminal equipment, a messaging device, a game console, a tablet device, a medical equipment, a fitness equipment, a personal digital assistant, etc.

As illustrated in FIG. 9, the UE 900 may include at least one component: a processing component 902, a memory 904, a power supply component 906, a multimedia component 908, an audio component 910, an input/output (I/O) interface 912, a sensor component 913, and a communication component 916.

The processing component 902 generally controls the whole operation of the UE 900, such as operations related to display, phone call, data communication, camera operation, and recording operation. The processing component 902 may include one or more processors 920 to perform instructions, to complete all or part of steps of the above methods. In addition, the processing component 902 may include at least one module for the convenience of interaction between the processing component 902 and other components. For example, the processing component 902 may include a multimedia module for the convenience of interaction between the multimedia component 908 and the processing component 902.

The memory 904 is configured to store all types of data to support an operation of the UE 900. Examples of the data include the instructions of any applications or methods operated on the UE 900, contact data, phone book data, messages, pictures, videos, etc. The memory 904 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 906 may provide power supply for all components of the UE 900. The power supply component 906 may include a power supply management system, at least one power supply, and other components related to generating, managing and distributing power for the UE 900.

The multimedia component 908 includes a screen of an output interface provided between the UE 900 and the user. In some embodiments, a screen may include a liquid crystal display (LCD) and a touch panel (TP). When the screen includes a touch panel, the screen may be implemented as a touch screen to receive input signals from the user. The touch panel includes at least one touch sensor to sense touching, sliding and gestures on the touch panel. The touch sensor may not only sense the boundary of touch or slide action, but also detect wakeup time and pressure related to the touching or sliding operation. In some embodiments, the multimedia component 908 includes a front camera and/or a rear camera. When the UE 900 is in operation mode, such as shooting mode or video mode, the front camera or the rear camera may receive external multimedia data. Every front camera and rear camera may be a fixed optical lens system or an optical lens system with focal length and optical zoom capacity.

The audio component 910 is configured as an output and/or input signal. For example, the audio component 910 includes a microphone (MIC). When the UE 900 is in operation mode, such as call mode, record mode, and speech recognition mode, a microphone is configured to receive external audio signals. The audio signals received may be further stored in the memory 904 or sent via the communication component 916. In some embodiments, the audio component 910 further includes a speaker configured to output an audio signal.

The I/O interface 912 provides an interface for the processing component 902 and the peripheral interface module, and the peripheral interface module may be a keyboard, a click wheel, a button, etc. The buttons may include but not limited to a home button, a volume button, a start button and a lock button.

The sensor component 913 includes at least one sensor configured to provide status assessments in all aspects for the UE 900. For example, the sensor component 913 may detect an on/off state of the UE 900 and relative positioning of the component. For example, the component is a display and a keypad of the UE 900. The sensor component 913 may further detect a location change of the UE 900 or one component of the UE 900, presence or absence of contact between the user and the UE 900, an orientation or acceleration/deceleration of the UE 900, and a temperature change of the UE 900. The sensor component 913 may include a proximity sensor, which is configured to detect the existence of the objects nearby without any physical contact. The sensor component 913 may further include a light sensor such as a CMOS or CCD image sensor, which is configured to use in imaging applications. In some embodiments, the sensor component 913 may further include an acceleration transducer, a gyroscope sensor, a magnetic sensor, a pressure sensor or a temperature sensor.

The communication component 916 may be configured for the convenience of wired or wireless communication between the UE 900 and other devices. The UE 900 may access wireless networks based on a communication standard, such as Wi-Fi™, 2G or 3G, or their combination. In an exemplary embodiment, the communication component 916 receives broadcast signals or broadcast-related information from an external broadcast management system via a broadcast channel. In an exemplary embodiment, the communication component 916 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth™ (BT) technology and other technologies.

In some embodiments, the UE 900 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronics components, which is configured to perform the above method.

Figure 10:
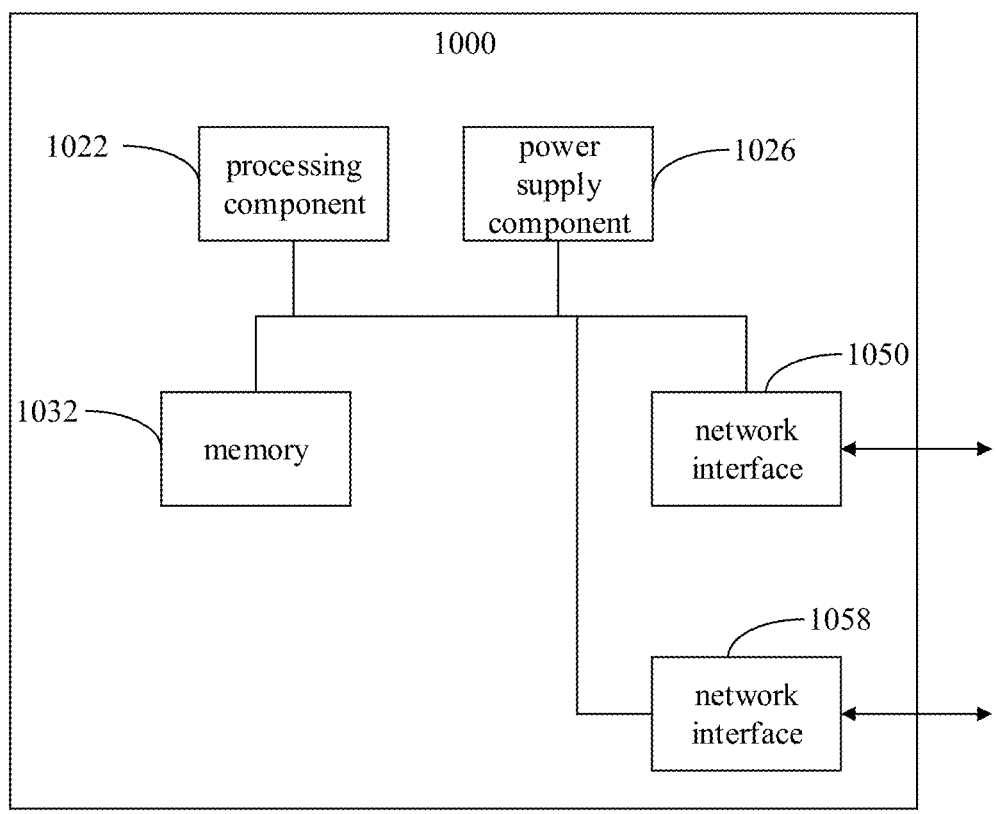
FIG. 10 is a block diagram illustrating a network side device according to some embodiments of the disclosure.

FIG. 10 is a block diagram illustrating a network side device 1000 according to embodiments of the disclosure. For example, the network side device 1000 may be provided as a network side device. As illustrated in FIG. 10, the network side device 1000 includes a processing component 1011, which further includes at least one processor, and memory resources represented by a memory 1032, which are configured to store instructions executable by a processing component 1022, for example, an application. The application stored in the memory 1032 may include one or more modules each of which corresponds to a set of instructions. In addition, the processing component 1010 is configured to execute instructions, to perform the any method applicable to the network side device as described in the above methods, for example, the method as illustrated in FIG. 1.

The network side device 1000 may further include one power supply component 1026 configured to execute power management of the network side device 1000, and one wired or wireless network interface 1050 configured to connect the network side device 1000 to a network, and one input/output (I/O) 1058. The network side device 1000 may operate an operating system stored in the memory 1032, for example, Windows Server™, Mac OS X™ Unix™, Linux™, FreeBSD™ or similar.

In embodiments provided in the disclosure, methods according to embodiments of the disclosure are introduced mainly from the perspectives of the network side device and the UE. To achieve various functions in the methods according to embodiments of the disclosure, the network side device and the UE each may include a hardware structure and a software module, to achieve the above functions in the form of the hardware structure, the software module, or the combination of the hardware structure and the software module. A certain function in the above functions may be performed by the hardware structure, the software module, or the combination of the hardware structure and the software module.

In embodiments provided in the disclosure, methods according to embodiments of the disclosure are introduced mainly from the perspectives of the network side device and the UE. To achieve various functions in the methods according to embodiments of the disclosure, the network side device and the UE each may include a hardware structure and a software module, to achieve the above functions in the form of the hardware structure, the software module, or the combination of the hardware structure and the software module. A certain function in the above functions may be performed by the hardware structure, the software module, or the combination of the hardware structure and the software module.

A communication device is provided according to embodiments of the disclosure. The communication device may include a transceiving module and a processing module. The transceiving module may include a transmitting module and/or a receiving module. The transmitting module is configured to implement a transmitting function, the receiving module is configured to implement a receiving function, and the transceiving module may implement a transmitting function and/or a receiving function.

The communication device may be a terminal device (for example, a terminal device in the above method embodiments), a device in the terminal device, or a device capable of being used with the terminal device. Alternatively, the communication apparatus may be a network device, a device in the network device, or a device capable of being used with the network device.

Another communication device is provided according to embodiments of the disclosure. The communication device may be a network device, a terminal device (a terminal device in the above method embodiments), or a chip, a system on chip, or a processor that supports the network device to implement the methods, or a chip, a system on chip, or a processor that supports the terminal device to implement the methods. The device may be configured to implement the methods described in the method embodiments, and may refer to descriptions in the method embodiments.

The communication device may include one or more processors. The processor may include a general purpose processor or a dedicated purpose processor. For example, the processor may be a baseband processor or a central processor. The baseband processor may be configured to process a communication protocol and communication data, and the central processor may be configured to control a communication device (e.g., a network side device, a baseband chip, a terminal device, a terminal device chip, a central unit (CU) or a distributed unit (DU), etc.), to execute a computer program, and process data of the computer program.

Optionally, the communication device may further include one or more memories with a computer program stored thereon. The processor executes the computer program so that the communication device performs the methods as described in the above method embodiments. Optionally, the memory may further store data. The communication device and the memory may be independently configured or integrated together.

Optionally, the communication device may further include a transceiver and an antenna. The transceiver may be referred to as a transceiving unit, a transceiver, or a transceiving circuit, which may be configured to achieve a transceiving function. The transceiver may include a receiver and a transmitter. The receiver may be referred to as a receiver or a receiving circuit, etc., for implementing a receiving function; and the transmitter may be referred to as a transmitter or a transmission circuit, etc. for implementing a transmitting function.

Optionally, the communication device may further include one or more interface circuits. The interface circuit is configured to receive code instructions and send the code instructions to the processor. The processor executes the code instructions so that the communication device performs the methods according to the above method embodiments.

The communication device is a terminal device (a terminal device in the above method embodiments): the processor is configured to execute the methods as illustrated in any one of FIGS. 1 to 4a.

The communication device is a network device: the transceiver is configured to execute the methods as illustrated in any one of FIGS. 5 to 7.

In an implementation, the processor may include a transceiver for implementing receiving and transmitting functions. For example, the transceiver may be a transceiving circuit, or an interface, or an interface circuit. The transceiving circuit, or the interface, or the interface circuit for implementing receiving and transmitting functions may be separate or integrated. The above-mentioned transceiving circuit, interface, or interface circuit may be used for reading and writing code/data, or the above-mentioned transceiving circuit, interface, or interface circuit may be used for signal transmission/reception.

In an implementation, the processor may store a computer program. The computer program runs on the processor so that the communication device performs the methods as described in the above method embodiments. The computer program may be solidified in the processor, in which case the processor may be implemented by hardware.

In an implementation, the communication device may include a circuit. The circuit may implement the functions of sending or receiving or communicating in the foregoing method embodiments. The processor and the transceiver described in the disclosure may be implemented in an integrated circuits (IC), an analog IC, a radio frequency integrated circuit (RFIC), a mixed-signal IC, an application specific integrated circuit (ASIC), a printed circuit board (PCB), electronic equipment, or the like. The processor and the transceiver may also be fabricated using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device (for example, a terminal device in the above method embodiments), but the scope of the communication device described in the disclosure is not limited thereto, and a structure of the communication device may not be subject to FIG. 10. The communication device may be a stand-alone device or may be a part of a larger device. For example, the communication device may be:

(1) a stand-alone IC, or a chip, or a chip system, or a chip subsystem;
(2) a set of one or more ICs, optionally, the set may also include a storage component for storing data and computer programs;
(3) an ASIC, such as a modem;
(4) a module that may be embedded in other devices;
(5) a receiver, a terminal device, an intelligent terminal device, a cellular phone, a wireless device, a handset, a mobile unit, an in-vehicle device, a network device, a cloud device, an artificial intelligence device, etc.;
(6) others.

In the case that the communication device may be a chip or a system on chip, the chip includes a processor and a chip. There may be one or more processors, and there may be a plurality of interfaces.

Optionally, the chip further includes a memory. The memory is configured to save a necessary computer program and data.

Those skilled in the art may also understand that various illustrative logical blocks and steps listed in the embodiments of the disclosure may be implemented in electronic hardware, computer software, or a combination thereof. Whether such function is implemented in hardware or software depends on specific applications and overall system design requirements. Those skilled in the art may use various manners to implement functions for each specific application, but such implementation should not be understood as exceeding the protection scope of the embodiments of the disclosure.

A system for determining a sidelink duration is further provided according to embodiments of the disclosure. The system includes a communication device (for example, a first terminal device in the above method embodiments) serving as a terminal device in embodiments and a communication device serving as a network device in embodiments, or the system includes a communication device serving as a terminal device (for example, a first terminal device in the above method embodiments) and a communication device serving as a network device in embodiments.

A readable storage medium with instructions stored thereon is further provided in the disclosure. When the instructions are executed by a computer, steps in the any one method embodiment are implemented.

A computer program product is further provided. The computer program product implements functions of the above any one method embodiment when executed by a processor.

According to the above embodiments, it may be implemented in whole or in part by software, hardware, firmware, or any combination thereof. When it is implemented in software, it may be implemented in whole or in part in a form of computer program product. The computer program product includes one or more computer programs. When the computer programs are loaded and executed on the computer, flows or functions according to the embodiments of the disclosure may be generated in whole or in part. The computer may be a general purpose computer, a special purpose computer, a computer network, or other programmable device. The computer programs may be stored on a computer-readable storage medium or transferred from one computer-readable storage medium to another computer-readable storage medium, for example, the computer programs may be transferred from a website site, a computer, a server, or a data center over a wire (e.g. coaxial cable, optical fiber, digital subscriber line (DSL)) or wireless (e.g. infrared, wireless, microwave) means to another website site, another computer, another server, or another data center. The computer-readable storage medium may be any available medium that may be accessed by a computer or a data storage device such as a server, a data center, or the like that includes an integration of one or more available media. The available medium may be a magnetic medium (e.g., floppy disk, hard disk, magnetic tape), an optical medium (e.g., high-density digital video disc (DVD)), a semiconductor medium (e.g., solid state disk (SSD)), or the like.

Those skilled in the art may understand that the first, second, and other numeral numbers involved in the disclosure are only for the convenience of description, and are not used to limit the scope of the embodiments of the disclosure, which also represent a sequence.

At least one in this disclosure may also be described as one or more, which is not limited in this disclosure. A plurality of or multiple in this disclosure may be two, three, four, or more, which is not limited in this disclosure. In the embodiments of the disclosure, for a type of technical features, the technical features are distinguished by "first", "second", "third", "A", "B", "C" and "D", etc. There is no order or order of magnitude for the technical features described in "first", "second", "third", "A", "B", "C" and "D", etc.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of embodiments in the disclosure are given by the appended claims.

It should be understood that the disclosure is not limited to the precise structure described above and shown in the drawings, and various modifications and changes may be made without departing from its scope. The scope of the present application is only limited by the appended claims. The scope of the disclosure is only limited by the appended claims.

What is claimed is:

1. A precoding method, performed by a reconfigurable intelligent surface (RIS) array, the method comprising:
    determining a phase shift list corresponding to the RIS array, wherein the phase shift list comprises at least one row of phase shift sequence, and the phase shift sequence comprises a phase shift of each RIS array element in the RIS array, wherein each row of phase shift sequence is configured to cause the RIS array to reflect an incident signal along a pair of reflection angles, the pair of reflection angles comprises a horizontal-dimension reflection angle and a vertical-dimension reflection angle, and each row of phase shift sequence corresponds to one index value;
    acquiring a first index value from a user equipment (UE);
    determining a first phase shift sequence corresponding to the first index value from the phase shift list; and
    precoding the RIS array by configuring the phase shift of each RIS array element in the RIS array according to the first phase shift sequence.

2. The method according to claim 1, wherein determining the phase shift list corresponding to the RIS array comprises at least one of:
    establishing the phase shift list by the RIS array; or
    receiving the phase shift list from a base station.

3. The method according to claim 2, wherein establishing the phase shift list by the RIS array comprises:
    acquiring at least one pair of reflection angles by quantizing a horizontal-dimension reflection angle and a vertical-dimension reflection angle corresponding to the RIS array;
    determining a pair of phase shift weight vectors corresponding to each pair of reflection angles quantized according to a horizontal-dimension incident angle and a vertical-dimension incident angle of an incident signal, wherein the pair of phase shift weight vectors comprises a horizontal-dimension phase shift weight vector and a vertical-dimension phase shift weight vector;
    determining a continuous phase shift of each RIS array element corresponding to each pair of phase shift weight vectors;
    acquiring a quantized phase shift of each RIS array element corresponding to each pair of phase shift weight vectors by quantizing the continuous phase shift of each RIS array element corresponding to each pair of phase shift weight vectors;
    acquiring at least one phase shift sequence by taking the quantized phase shift of each RIS array element corresponding to each pair of phase shift weight vectors as a phase shift sequence; and
    establishing the phase shift list by sorting the at least one phase shift sequence by row.

4. The method according to claim 3, wherein the RIS array is an M×N array, where M and N are positive integers; and
    quantizing the horizontal-dimension reflection angle and the vertical-dimension reflection angle corresponding to the RIS array comprises:
    quantizing the horizontal-dimension reflection angle by an interval $$\frac{2\pi}{M \times p},$$

and quantizing the vertical-dimension reflection angle by an interval $$\frac{2\pi}{N \times q}$$

where p, q are oversampling factors.

5. The method according to claim 3, wherein acquiring the quantized phase shift of each RIS array element corresponding to each pair of phase shift weight vectors by quantizing the continuous phase shift of each RIS array element corresponding to each pair of phase shift weight vectors comprises:
  setting at least one discrete phase shift; and
  replacing the continuous phase shift by a discrete phase shift in the at least one discrete phase shift which has a minimum absolute value of a difference value with the continuous phase shift.

6. The method according to claim 3, wherein sorting the at least one phase shift sequence by row comprises at least one of:
  sorting phase shift sequences by row for a first time in order of sizes of horizontal-dimension reflection angles corresponding to the phase shift sequences, and sorting, phase shift sequences corresponding to the same horizontal-dimension reflection angle in the phase shift sequences after sorting for the first time, in order of sizes of vertical-dimension reflection angles corresponding to the phase shift sequences corresponding to the same horizontal-dimension reflection angle by row for a second time; or
  sorting phase shift sequences by row for a first time in order of sizes of vertical-dimension reflection angles corresponding to the phase shift sequences, and sorting, phase shift sequences corresponding to the same vertical-dimension reflection angle in the phase shift sequences after sorting for the first time, in order of sizes of horizontal-dimension reflection angles corresponding to the phase shift sequences corresponding to the same vertical-dimension reflection angle by row for a second time.

7. The method according to claim 1, wherein each row of phase shift sequence in the phase shift list corresponds to one row index value; and
  acquiring the first index value from the UE comprises:
  acquiring a first row index value from the UE.

8. The method according to claim 1, further comprising:
  grouping phase shift sequences in the phase shift list, and setting a group number for each phase shift sequence group, wherein one phase shift sequence group comprises adjacent at least one row of phase shift sequence; and
  numbering each row of phase shift sequence in each phase shift sequence group.

9. The method according to claim 8, wherein acquiring the first index value from the UE comprises:
  acquiring a group number and an intra-group number from the UE.

10. A precoding method, performed by a user equipment (UE), comprising:
  determining a phase shift list corresponding to a reconfigurable intelligent surface (RIS) array, wherein the phase shift list comprises at least one row of phase shift sequence, and the phase shift sequence comprises a phase shift of each RIS array element in the RIS array, wherein each row of phase shift sequence is configured to cause the RIS array to reflect an incident signal along a pair of reflection angles, the pair of reflection angles comprises a horizontal-dimension reflection angle and a vertical-dimension reflection angle, and each row of phase shift sequence corresponds to one index value;
  determining an optimal phase shift sequence; and
  sending a first index value corresponding to the optimal phase shift sequence to the RIS array.

11. The method according to claim 10, wherein determining the phase shift list corresponding to the RIS array comprises at least one of:
  acquiring the phase shift list from the RIS array; or
  acquiring the phase shift list from a base station.

12. The method according to claim 10, wherein each row of phase shift sequence in the phase shift list corresponds to one row index value; and
  wherein sending the first index value corresponding to the optimal phase shift sequence to the RIS array comprises:
  sending a first row index value corresponding to the optimal phase shift sequence to the RIS array.

13. The method according to claim 10, further comprising:
  grouping phase shift sequences in the phase shift list, and setting a group number for each phase shift sequence group, wherein one phase shift sequence group comprises adjacent at least one row of phase shift sequence; and
  numbering each row of phase shift sequence in each phase shift sequence group.

14. The method according to claim 13, wherein sending the first index value corresponding to the optimal phase shift sequence to the RIS array comprises:
  sending a group number and an intra-group number corresponding to the optimal phase shift sequence to the RIS array.

15. A reconfigurable intelligent surface (RIS) array, comprising:
  a processor; and a memory storing a computer program,
  wherein the RIS array is configured to perform:
  determining a phase shift list corresponding to the RIS array, wherein the phase shift list comprises at least one row of phase shift sequence, and the phase shift sequence comprises a phase shift of each RIS array element in the RIS array, wherein each row of phase shift sequence is configured to cause the RIS array to reflect an incident signal along a pair of reflection angles, the pair of reflection angles comprises a horizontal-dimension reflection angle and a vertical-dimension reflection angle, and each row of phase shift sequence corresponds to one index value;
  acquiring a first index value from a user equipment (UE);
  determining a first phase shift sequence corresponding to the first index value from the phase shift list; and
  precoding the RIS array by configuring the phase shift of each RIS array element in the RIS array according to the first phase shift sequence.

16. A UE, comprising:
  a processor; and
  a memory storing a computer program,
  wherein the UE is configured to perform the method according to claim 10.

17. A communication device, comprising a processor and an interface circuit;
 wherein the interface circuit is configured to receive code instructions and send the code instructions to the processor; and
 the processor is configured to execute the code instructions to perform the method according to claim 1.

18. A communication device, comprising a processor and an interface circuit;
 wherein the interface circuit is configured to receive code instructions and send the code instructions to the processor; and
 the processor is configured to execute the code instructions to perform the method according to claim 10.

19. A non-transitory computer-readable storage medium storing instructions, wherein when the instructions are executed, the method according to claim 1 is implemented.

20. A non-transitory computer-readable storage medium storing instructions, wherein when the instructions are executed, the method according to claim 10 is implemented.

* * * * *